United States Patent
Wilson, Jr. et al.

(10) Patent No.: US 6,918,801 B2
(45) Date of Patent: Jul. 19, 2005

(54) AMPHIBIOUS VEHICLE

(76) Inventors: John Wilson, Jr., 2848 Sprig Dr., Marrero, LA (US) 70072; Robert Wilson, 109 Victors Rd., Belle Chase, LA (US) 70037

( * ) Notice: Subject to any disclaimer, the term of this patent is extended or adjusted under 35 U.S.C. 154(b) by 0 days.

(21) Appl. No.: 10/453,795

(22) Filed: Jun. 3, 2003

(65) Prior Publication Data

US 2004/0248480 A1 Dec. 9, 2004

(51) Int. Cl.$^7$ ................................................ B60F 3/00
(52) U.S. Cl. ........................ 440/12.63; 37/346; 114/395
(58) Field of Search ............................ 440/12.5, 12.56, 440/12.63, 12.64, 95; 114/293, 294, 295; 37/345, 346

(56) References Cited

U.S. PATENT DOCUMENTS

| | | | | |
|---|---|---|---|---|
| 3,656,449 A | * | 4/1972 | Mead | ............................ 440/36 |
| 3,842,785 A | * | 10/1974 | Rivet | ........................ 440/12.64 |
| 3,902,448 A | * | 9/1975 | Davis | ............................ 37/346 |
| 3,951,093 A | | 4/1976 | Poche | |
| 4,070,978 A | * | 1/1978 | Virgilio | ......................... 114/26 |
| 4,312,762 A | | 1/1982 | Blackburn et al. | |
| 4,399,623 A | * | 8/1983 | Neumann | ..................... 37/308 |
| 4,658,751 A | | 4/1987 | Koot | |
| 4,713,896 A | | 12/1987 | Jennens | |
| 4,846,092 A | * | 7/1989 | Wilson | .................... 440/12.64 |
| 5,311,682 A | | 5/1994 | Sturdivant | |
| 5,379,709 A | | 1/1995 | Wilkerson | |
| 5,511,508 A | | 4/1996 | Wilson, Sr. | |
| 5,740,875 A | | 4/1998 | Wilson, Sr. | |
| 5,791,074 A | | 8/1998 | Pryor | |
| 6,273,767 B1 | * | 8/2001 | Mustonen | ................ 440/12.51 |
| 6,315,622 B1 | | 11/2001 | Wilson, Sr. | |
| 6,482,053 B1 | | 11/2002 | Prestenbach | |
| 2002/0112460 A1 | | 8/2002 | Penny | |

* cited by examiner

Primary Examiner—Andrew D. Wright
(74) Attorney, Agent, or Firm—Conley Rose, P.C.

(57) ABSTRACT

A vehicle adapted to operate on dry land, in soft terrain, and while floating. The vehicle includes a chassis formed by two interconnected pontoon sections sized such that the chassis and equipment will float. The pontoons are fitted with a track system providing propulsion to the vehicle. The chassis a plurality of spuds that are deployed to a position extending below the bottom of the pontoons so as to stabilize the vehicle for operations while floating.

18 Claims, 4 Drawing Sheets

AMPHIBIOUS VEHICLE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The embodiments of the present invention relate generally to amphibious vehicles and in particular to amphibious excavating equipment. More particularly, the embodiments provide a tracked, self-propelled platform from which equipment can operate on land or floating in a body of water.

Amphibious vehicles, known as marsh buggies, were first developed over 50 years ago to support oil and gas exploration operations conducted in marshy or swampy terrain. Marsh buggies typically include a pair of pontoons connected to a center platform. The pontoons are usually surrounded by a cleated track system which is capable of engaging ground, water, or swamp land to propel the vehicle. The track system uses one or more endless chains surrounding the periphery of each pontoon. The endless chains, supporting the cleated tracks, are driven about the periphery of the pontoons, by a sprocket or other means, in order to provide propulsion to the vehicle. By varying the track speed around each pontoon, the vehicle can be advanced, turned, or reversed.

Marsh buggies are ideal for operation in wetlands, marshlands, and other low-lying areas because of the relatively low pressures exerted on the ground through the large, tracked pontoons. Therefore, marsh buggies will not sink into the soft soil in low-lying or submerged areas and have minimal environmental impact while traveling to and from a remote job site. Marsh buggies have been adapted to haul personnel and cargo as well as serve as the operating platform for various types of equipment, such as excavators, draglines, and backhoes.

Over the last several years, the environmental impact of operations in marshlands, wetlands, and other low-lying areas is of increasing concern. Many marshland and wetland areas are deteriorating and significant effort is being expended to preserve, protect, and restore these areas. Marsh buggies are currently being used in these restorations and preservation efforts. Marsh buggies are used to provide heavy earth-moving equipment to these low-lying, soft terrain areas for operations such as wetland restoration, crust management (de-watering), dredging, levee building, coastal erosion, and other environmental remediation operations.

Marsh buggies have proved useful in performing earth moving operations in soft-terrain and are often capable of floating in order to navigate small bodies of water. Although marsh buggies are often capable of moving through any terrain, these vehicles aren't designed to operate while floating in water deeper than their pontoons. Thus, marsh buggies are limited in performing earth-moving operations to dry land or relatively shallow water where their pontoons are resting on the ground.

When water depths preclude the use of marsh buggies, other equipment must be used. One such piece of equipment, facilitating operation in deeper water, is a spud barge. Spud barges are essentially floating platforms fitted with pilings that are extended into the bottom of the body of water on which the barge is floating. These pilings, known as spuds, fix the horizontal location of the barge during operations. Heavy equipment, which has been mounted to or placed on the barge, can be operated once the barge is fixed in location.

One drawback to spud barges is that the barge's access to land-locked bodies of water is limited. In other words, the barge has to be floated to the location in which it is to operate. For example, if dredging operations were needed in a lake that had no deep water access, the barge would have difficulty gaining access to the lake. Where no access is provided, it has been one common practice in low-lying, marshlands to have the spud barge dig a channel of sufficient depth to allow the barge to float to the work site. Not only does this technique add to the duration and complexity of the project, it also increases the environmental impact of the project.

Thus, there remains a need in the art for providing a self-propelled, amphibious vehicle capable of supporting operations on land or while floating. Therefore, the embodiments of the present invention are directed to methods and apparatus for providing versatile excavating systems that seek to overcome the limitations of the prior art.

SUMMARY OF THE PREFERRED EMBODIMENTS

The preferred embodiments provide a vehicle adapted to operate on dry land, in soft terrain, and while floating. The vehicle includes a piece of equipment, such as a hydraulic excavator or a dragline, mounted on a chassis. The chassis is formed by two interconnected pontoon sections, which are sized such that the chassis and equipment will float and are fitted with an endless-chain track system having cleats that provide propulsion either on land or in the water. The chassis also has two or more spuds that are deployed in order to stabilize the vehicle for operations while floating.

In one embodiment, the vehicle includes a chassis supporting at least two pontoons providing sufficient buoyancy such that the vehicle can float on water. Each pontoon has a track system, formed from cleats attached to endless chains, that provides propulsion to the vehicle. A piece of earth excavating equipment, such as a hydraulic excavator or a dragline, maybe supported by the chassis. The vehicle also includes a plurality of spuds connected to the chassis, wherein the spuds have a deployed position extending below the bottom of the pontoons and a retracted position where the spuds are above the bottom of the pontoons. The spuds are integrated into spud assemblies that deploy and recover the spuds.

One embodiment of a spud assembly includes a winch secured to the chassis and connected to a spud by a winch cable. The spud is slidably engaged with a spud retainer that is attached to the side of the chassis. One preferred winch has a release mode, where the winch cable is spooled out by the spud moving downward under the influence of gravity, and a recovery mode, where the winch cable is spooled onto the winch as the spud moves upward.

An alternative spud assembly includes a spud retainer attached to the chassis and slidably engaging one of the spuds. A hydraulic cylinder is attached between the spud retainer, or the chassis, and a link that is releasably connected to the spud. The spud is deployed and recovered using the hydraulic cylinder to provide the linear movement where the pin and link are used to change the position of the attachment between the cylinder and the spud.

In another embodiment, the vehicle includes an amphibious chassis having pontoons fitted with powered track systems and a plurality of spud assemblies. The track systems are adapted to provide propulsion to the vehicle on both land and in the water. Various pieces of equipment, including hydraulic excavators and draglines, can be mounted to the amphibious chassis. The mounted equipment has a first operating mode, wherein the vehicle is resting on the ground, and a second operating mode, wherein the vehicle is floating in water and the plurality of spud assemblies laterally support the vehicle.

In another embodiment, a method for performing earth moving operations includes providing earth excavating equipment disposed on a vehicle adapted to move over land or through the water, floating the vehicle carrying the earth excavating equipment in a body of water, deploying a plurality of spuds from the vehicle into the bottom of the body of water in order to secure the lateral location of the vehicle, and performing earth excavating operations. The method may also include retracting the plurality of spuds from the bottom of the body of water, moving the vehicle to a position where the vehicle is not floating but is resting at the bottom of a body of water, and performing earth excavating operations. The vehicle may also perform earth moving operations after being moved to a position not in a body of water where the vehicle is resting on land. In order to move to each position, the vehicle can move over land or through water under its own power.

Thus, the present invention comprises a combination of features and advantages that enable it to provide for an amphibious excavating system. These and various other characteristics and advantages of the preferred embodiments will be readily apparent to those skilled in the art upon reading the following detailed description and by referring to the accompanying drawings.

BRIEF DESCRIPTION OF THE DRAWINGS

For a more detailed understanding of the preferred embodiments, reference is made to the accompanying Figures, wherein.

DETAILED DESCRIPTION OF THE PREFERRED EMBODIMENTS

Figure 1:
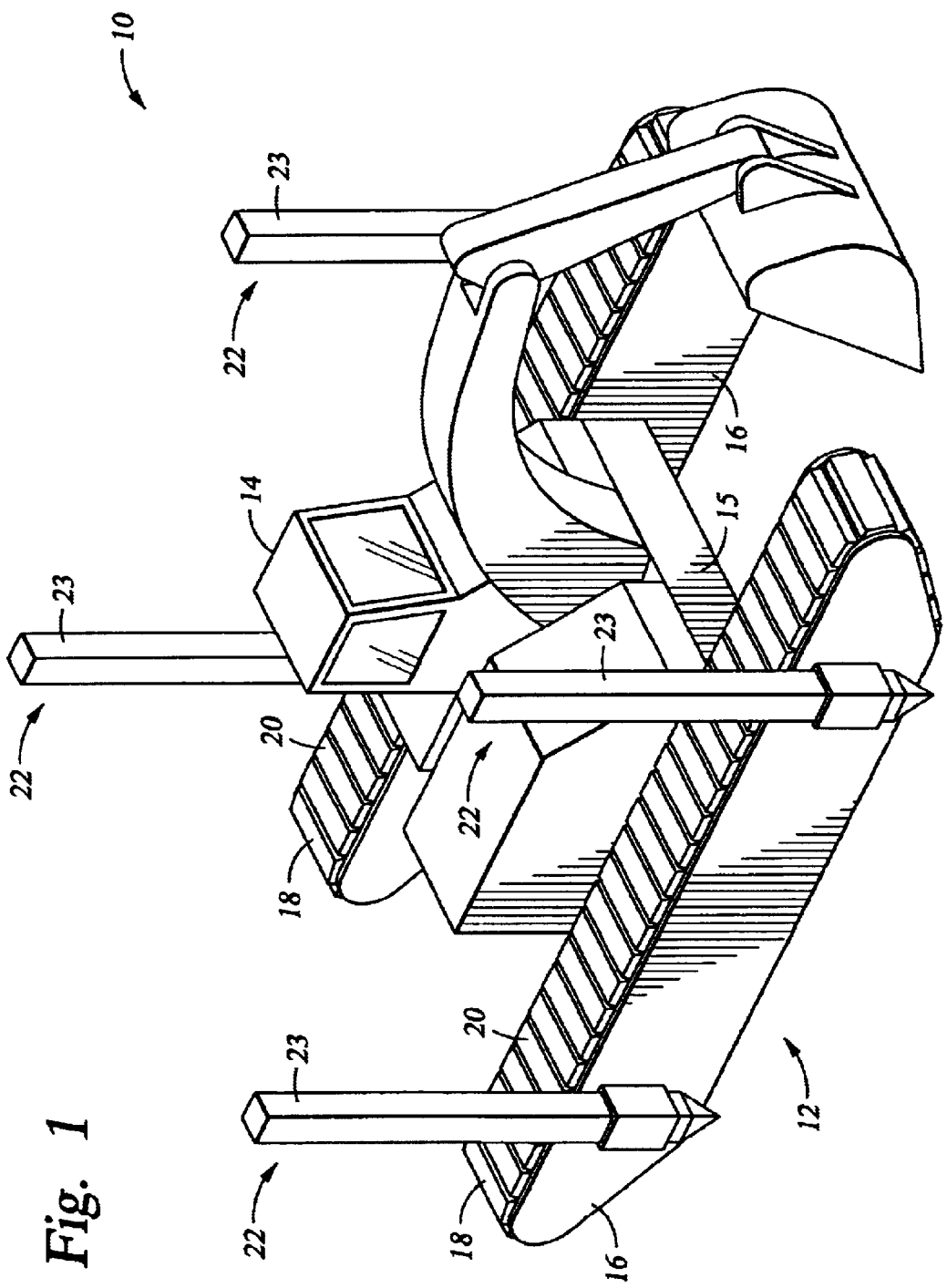
FIG. 1 is an isometric view of an amphibious vehicle.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce the desired results.

In particular, various embodiments of the present invention provide a number of different methods and apparatus for providing an amphibious platform supporting heavy excavating equipment. The concepts of the invention are discussed in the context of heavy excavating equipment, such as a hydraulic excavator, but the use of the concepts of the present invention is not limited to this particular application and may be applied to any amphibious equipment application. The concepts disclosed herein may find application with other equipment types, such as backhoes, shovels, or loaders, as well as other mobile, amphibious applications.

Referring now to FIG. 1, an amphibious spud barge 10 is shown including a chassis 12 and a hydraulic excavator 14. Hydraulic excavator 14 is preferably mounted to a chassis cross member 15. Chassis 12 includes two pontoons 16, which are connected by chassis cross member 15 and equipped with endless-chain track systems 18 having a plurality of cleats 20. Track systems 18 are driven so as to provide forward motion to barge 10 by the moving cleats 20 pushing on the land or in the water. Pontoons 16 are preferably constructed so as to provide adequate buoyancy to enable barge 10 to float in water. Thus, spud barge 10 can traverse dry land, soft soils, and water using the propulsion provided by the cleats 20 on track systems 18.

Pontoons 16 are also equipped with spud assemblies 22 located on the sides of the pontoons. The spud assemblies 22 include elongated spuds 23 that can be extended below the bottom of the pontoons 16. The spuds 23 can take many forms, but are essentially an elongated column that reaches from the barge to the bottom of the body of water in which the barge is floating. The spuds 23 are of sufficient strength to provide lateral support to the floating barge 10 to keep the barge in one position by resisting the forces both from water motion (e.g. current, tides, waves) and from the operations of the equipment on the barge 10. The spud assemblies 22 may be permanently mounted to the barge or be removable such that they can be installed when required and stored, either on or off the barge, when not in use.

Figure 2:
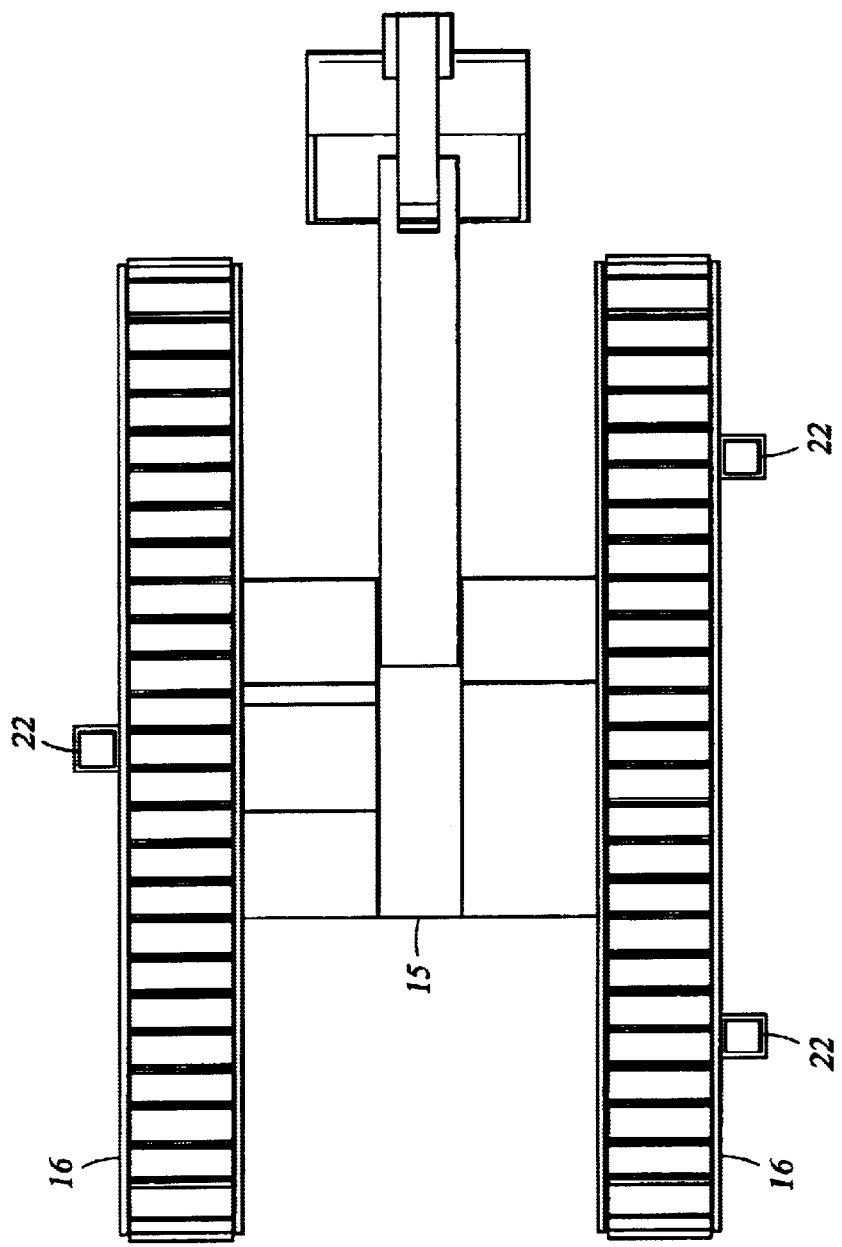
FIG. 2 is a top down, partial view of one embodiment of an amphibious vehicle.

FIG. 1 depicts a spud barge 10 having four spud assemblies 22, with two assemblies 22 located near the outside corners of each pontoon 16. FIG. 2 depicts an alternative arrangement of a spud barge 24 having three spud assemblies 22, with two assemblies 22 on one pontoon 16 and one assembly 22 on the other pontoon 16. Although using less than three spud assemblies may result in less than desired stability, any number of spud assemblies 22 may be used in any arrangement desired. Certain embodiments may include adjustable spud assembly arrangements so that individual spud assemblies can be repositioned depending on the needs of the work being performed.

Figure 3:
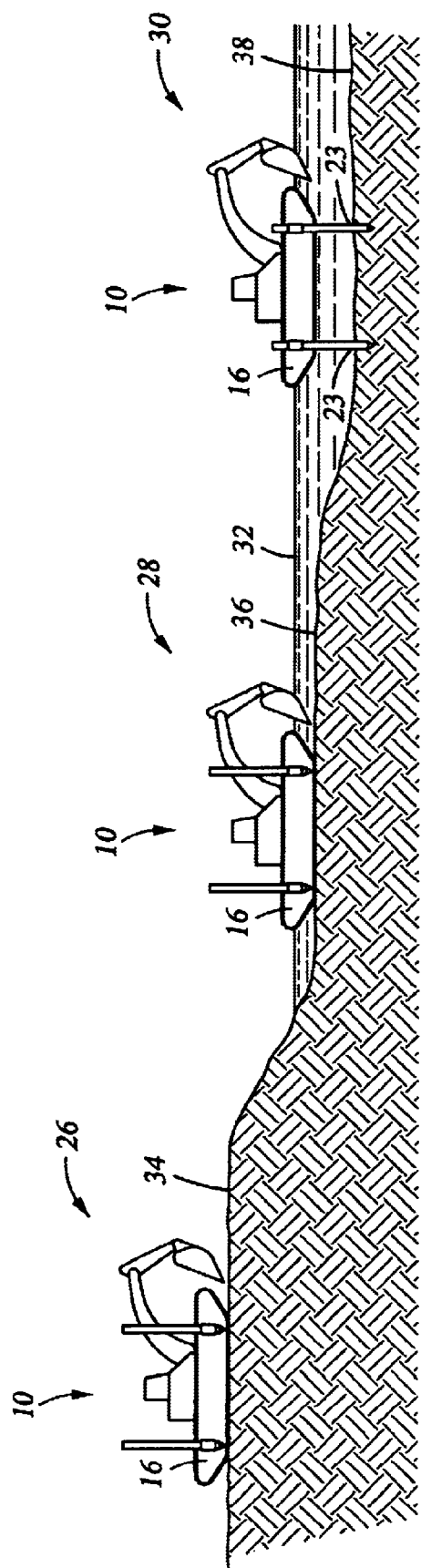
FIG. 3 is a schematic view of the operation modes of an amphibious vehicle.

Amphibious spud barge 10 provides three distinct operating modes as can be seen in FIG. 3. In a land-based mode 26, barge 10 sits on land 34 and pontoons 16 distribute the weight of barge 10 so that the barge can operate in soft soil or mud. In an amphibious mode 28, barge is in shallow water where pontoons 16 sit on the bottom 36 but waterline 32 is below the top of the pontoons 16 and the depth is not sufficient to float the barge. In a full-floatation mode 30, barge 16 is floating on pontoons 16. Spud assemblies 22 are extended into the bottom 38 to stabilize barge 22 against lateral movement.

Thus, barge 10 can operate in a fixed-pontoon mode (e.g. either land-based mode 26 or amphibious mode 28), where the pontoons 16 are sitting firmly on the ground, and in a floating-pontoon mode (e.g. full-flotation mode 30), where the pontoons 16 provide the buoyancy to float the barge 10. Spud assemblies 22 provide the resistance to lateral motion that is needed to stabilize barge 10 in full-flotation mode 30 and can also be used in either fixed-pontoon mode to further stabilize barge 10 as desired.

Figure 4:
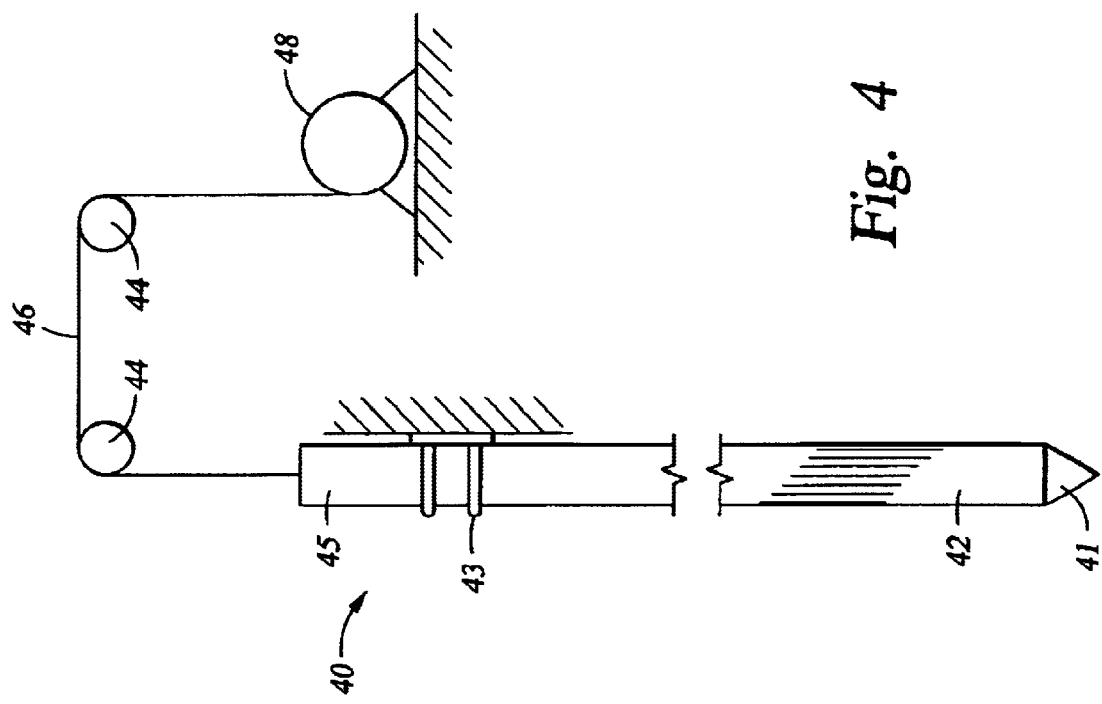
FIG. 4 is a schematic view of one embodiment of a spud assembly.

In some embodiments, spud assemblies 22 may be manually deployed and recovered, but in the preferred embodiments the spud assemblies 22 are mechanized, at least to the extent needed for efficient deployment and recovery of the spuds. One embodiment, as shown in FIG. 4, involves a spud assembly 40 that is partially mechanized by being gravity deployed and recovered using a powered winch. Another embodiment, as shown in FIG. 5, spud assembly 50 is fully mechanized with a hydraulic cylinder being used to deploy and recover the spud.

Referring now to FIG. 4, spud assembly 40 is shown including spud 42, spud retainer 43, pulleys 44, winch 46, and winch cable 48. Spud 42 is an elongated body having a pointed lower end 41. Spud 42 is disposed slidably within, and laterally restrained by, spud retainer 43, which is attached to a stable surface, such as the side of a pontoon. Winch cable 48 is attached to the upper end 45 of spud 42 and run over pulleys 44 to winch 46. Winch 46 is preferably a gravity spooled-out winch so that when the winch releases, the weight of spud 42 will spool line from winch 46. Winch 46 is activated to take-up cable 48 to retrieve spud 42.

Alternately, the winch cable could be wound around one or more stationary pulleys and around one or more pulleys integrated into the spud and then the end of the cable, known as the deadline, fixed to the vehicle. The stationary and spud-mounted pulleys would work like the block assembly of a hoist, giving mechanical advantage to the cable, effectively multiplying the load able to be lifted by a single strand of cable and enabling the use of lower power winches. There are many pulley configurations that would work, including those that would allow a single winch to control the deployment and recovery of multiple spuds.

Figure 5:
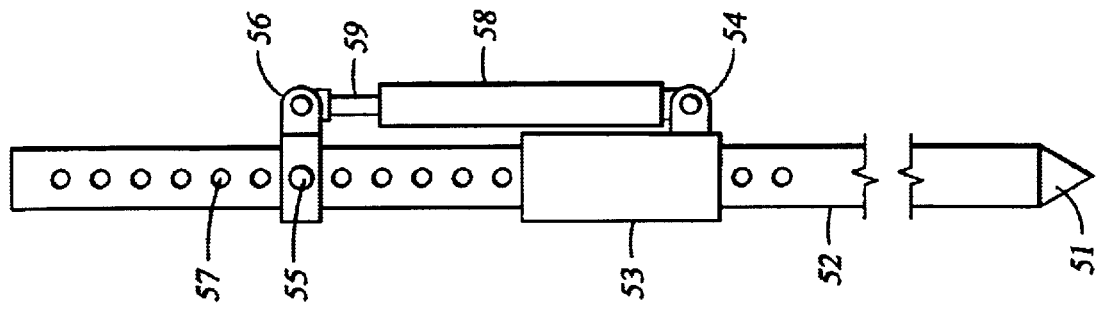
FIG. 5 is a schematic view of a second embodiment of a spud assembly.

Referring now to FIG. 5, spud assembly 50 is shown including spud 52, spud retainer 53, and hydraulic cylinder 58. Spud 52 is an elongated body having a pointed lower end 51 and a plurality of slots 57 along its body. Spud 52 is disposed slidably within, and laterally restrained by, spud retainer 53, which is attached to a stable surface, such as the side of a pontoon. Hydraulic cylinder 58 is attached to spud retainer 53 at lower connection 54. The rod 59 of cylinder 58 is attached to link 56. Pin 55 connects link 56 to a slot 57 on spud 52.

To deploy spud 52, cylinder 58 is retracted, pulling spud 52 downward. Pin 55 is removed and cylinder 58 is extended while the position of spud 52 is maintained. Pin 55 is then reinserted, connecting spud 52 and cylinder 58, and cylinder 58 is retracted again, moving spud 52 lower. This procedure is repeated until spud 52 reaches the desired depth. Pin 55 may be removed or left installed during operations of the barge. Spud 52 is retrieved by reversing the process and leaving pin 55 engaged as cylinder 58 extends. Pin 55 is then removed to disconnect spud 52 as cylinder 58 is retracted and the pin 55 re-engaged.

The embodiments set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the present inventive concept, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A vehicle comprising:
   a chassis;
   at least two pontoons supported by said chassis, wherein said pontoons provide sufficient buoyancy such that the vehicle can float on water;
   a track system disposed on said pontoons and adapted to provide propulsion to the vehicle when moving on land or in water;
   a plurality of spuds connected to said chassis, wherein said spuds have a first position wherein said spuds extend below the bottom of said pontoons and a second position wherein said spuds do not extend below the bottom of said pontoons.

2. The vehicle of claim 1, further comprising a piece of earth excavating equipment supported by said chassis.

3. The vehicle of claim 2, wherein the piece of earth excavating equipment is a hydraulic excavator.

4. The vehicle of claim 1, wherein said track system further comprises two endless chains and a plurality of cleats attached to the endless chains.

5. The vehicle of claim 1, further comprising a plurality of spud assemblies adapted to deploy and recover said spuds from the first position.

6. The vehicle of claim 5, wherein said spud assemblies comprise:
   a winch secured to said chassis;
   a winch cable secured to one of said spuds and spooled onto said winch; and
   a spud retainer attached to said chassis and slidably engaging one of said spuds.

7. The vehicle of claim 6, wherein said winch has a released position where said winch cable is spooled out by said spud moving downward under the influence of gravity and a recovery position where said winch cable is spooled onto said winch as said spud moves upward.

8. The vehicle of claim 5, wherein said spud assemblies comprise:
   a spud retainer attached to said chassis an slidably engaging one of said spuds;
   a hydraulic cylinder attached at a first end to said spud retainer or said chassis;
   a link attached to a second end of said hydraulic cylinder; and
   a pin releasably connecting said link to said spud.

9. A method comprising:
   providing earth excavating equipment disposed on a vehicle adapted to move over land or through the water;
   floating the vehicle carrying the earth excavating equipment in a body of water;
   deploying a plurality of spuds from the vehicle into the bottom of the body of water;
   performing earth excavating operations;
   retracting the plurality of spuds such that the entirety of the spuds are above the bottom of the vehicle;
   moving the vehicle to a position where the vehicle is not floating but is resting at the bottom of a body of water; and
   performing earth excavating operations.

10. The method of claim 9, further comprising moving the vehicle to a position not in a body of water where the vehicle is resting on land.

11. The method of claim 9 wherein the vehicle moves over land or through water under its own power.

12. A vehicle comprising:
   an amphibious chassis including pontoons fitted with powered track systems adapted to provide propulsion to the vehicle both on land and in water;
   a plurality of spud assemblies attached to said amphibious chassis; and
   equipment mounted to said amphibious chassis, wherein said equipment has a first operating mode wherein the vehicle is resting on the ground and a second operating mode wherein the vehicle is floating in water, wherein said plurality of spud assemblies retract entirely above the bottom of the pontoons in the first operating mode and are adapted to laterally support the vehicle in the second operating mode.

13. The vehicle of claim 12, wherein the powered track systems provide propulsion both on land and in water.

14. The vehicle of claim 12, wherein said equipment is earth excavating equipment.

15. The vehicle of claim 12, wherein said equipment is a hydraulic excavator.

16. The vehicle of claim 12, wherein said spud assemblies comprise:

an elongated spud slidably engaged with a spud retainer attached to said chassis; a winch secured to said chassis; and a winch cable secured to said spud and spooled onto said winch.

17. The vehicle of claim 16, wherein said winch has a released position where said winch cable is spooled out as said spud moves downward under the influence of gravity and a recovery position where said winch cable is spooled onto said winch as said spud moves upward.

18. The vehicle of claim 12, wherein said spud assemblies comprise:

a spud slidably engaged with a spud retainer attached to said chassis;

a hydraulic cylinder attached at a first end to said spud retainer or said chassis;

a link attached to a second end of said hydraulic cylinder; and a pin releasably connecting said link to said spud.

* * * * *